United States Patent
Eiselt et al.

(10) Patent No.: US 7,603,042 B2
(45) Date of Patent: Oct. 13, 2009

(54) APPARATUS AND METHOD FOR OPTIMUM DECISION THRESHOLD SETTING

(76) Inventors: Michael H. Eiselt, 250 Martin Pl., Middletown, NJ (US) 07748; Lara Garrett, 23 Irving Pl., Red Bank, NJ (US) 07701; Samir Sheth, 6615 Desco Dr., Dallas, TX (US) 75225

( * ) Notice: Subject to any disclaimer, the term of this patent is extended or adjusted under 35 U.S.C. 154(b) by 457 days.

(21) Appl. No.: 10/454,813

(22) Filed: Jun. 3, 2003

(65) Prior Publication Data

US 2004/0070805 A1    Apr. 15, 2004

Related U.S. Application Data

(60) Provisional application No. 60/385,947, filed on Jun. 4, 2002.

(51) Int. Cl.
*H04B 10/06* (2006.01)

(52) U.S. Cl. ....................................................... 398/202

(58) Field of Classification Search ................. 398/202, 398/209; 714/704
See application file for complete search history.

(56) References Cited

U.S. PATENT DOCUMENTS

| | | | |
|---|---|---|---|
| 4,229,831 A | 10/1980 | Lacher | |
| 4,535,459 A | 8/1985 | Hogge, Jr. | |
| 4,636,859 A | 1/1987 | Vernhet et al. | |
| 4,710,022 A | 12/1987 | Soeda et al. | |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |
| 5,321,541 A | 6/1994 | Cohen | |
| 5,455,703 A | 10/1995 | Duncan et al. | |
| 5,559,625 A | 9/1996 | Smith et al. | |
| 5,581,077 A * | 12/1996 | Chirovsky et al. | ...... 250/214 R |
| 5,613,210 A | 3/1997 | Van Driel et al. | |
| 5,636,253 A * | 6/1997 | Spruyt | ........................ 375/348 |
| 5,726,784 A | 3/1998 | Alexander et al. | |
| 5,737,118 A | 4/1998 | Sugaya et al. | |
| 5,778,116 A | 7/1998 | Tomich | |
| 5,790,285 A | 8/1998 | Mock | |
| 5,812,290 A | 9/1998 | Maeno et al. | |
| 5,877,881 A | 3/1999 | Miyauchi et al. | |

(Continued)

FOREIGN PATENT DOCUMENTS

JP    01115230    5/1989

(Continued)

OTHER PUBLICATIONS

"Principles of Communication, 3rd Edition" by Ziemer et al., Houghton Mufflin, 1990, pp. 485-489.*

(Continued)

*Primary Examiner*—Shi K Li
(74) *Attorney, Agent, or Firm*—Woodcock Washburn LLP

(57) ABSTRACT

The invention pertains to optical fiber transmission systems, and is particularly relevant to transmission of large volumes of data over long distances at high rates. An apparatus and method for improved bit-error-rate (BER) performance when transmitting optical data over long distances using is disclosed. In particular, the improvement teaches the proper decision threshold setting of the optical signal at the receiver module.

27 Claims, 3 Drawing Sheets

U.S. PATENT DOCUMENTS

| | | | |
|---|---|---|---|
| 5,896,391 A * | 4/1999 | Solheim et al. ............. 714/704 |
| 5,903,613 A | 5/1999 | Ishida |
| 5,914,794 A | 6/1999 | Fee et al. |
| 5,914,799 A | 6/1999 | Tan |
| 5,936,753 A | 8/1999 | Ishikawa |
| 5,940,209 A | 8/1999 | Nguyen |
| 5,963,350 A | 10/1999 | Hill |
| 5,995,694 A | 11/1999 | Akasaka et al. |
| 6,005,702 A | 12/1999 | Suzuki et al. |
| 6,021,245 A | 2/2000 | Berger et al. |
| 6,038,062 A | 3/2000 | Kosaka |
| 6,075,634 A | 6/2000 | Casper et al. |
| 6,078,414 A | 6/2000 | Iwano |
| 6,081,360 A | 6/2000 | Ishikawa et al. |
| 6,084,694 A | 7/2000 | Milton et al. |
| 6,088,152 A | 7/2000 | Berger et al. |
| 6,108,074 A | 8/2000 | Bloom |
| 6,122,095 A | 9/2000 | Fatehi |
| 6,151,334 A | 11/2000 | Kim et al. |
| 6,157,477 A | 12/2000 | Robinson |
| 6,160,614 A | 12/2000 | Unno |
| 6,163,392 A | 12/2000 | Condict et al. |
| 6,163,636 A | 12/2000 | Stentz et al. |
| 6,173,094 B1 | 1/2001 | Bowerman et al. |
| 6,177,985 B1 | 1/2001 | Bloom |
| 6,198,559 B1 | 3/2001 | Gehlot |
| 6,229,599 B1 | 5/2001 | Galtarossa |
| 6,236,481 B1 | 5/2001 | Laor |
| 6,236,499 B1 | 5/2001 | Berg et al. |
| 6,246,510 B1 | 6/2001 | BuAbbud et al. |
| 6,259,553 B1 | 7/2001 | Kinoshita |
| 6,259,554 B1 | 7/2001 | Shigematsu et al. |
| 6,259,693 B1 | 7/2001 | Ganmukhi et al. |
| 6,259,845 B1 | 7/2001 | Sardesai |
| 6,272,185 B1 | 8/2001 | Brown |
| 6,275,315 B1 | 8/2001 | Park et al. |
| 6,275,959 B1 * | 8/2001 | Ransijn ............. 714/705 |
| 6,288,811 B1 | 9/2001 | Jiang et al. |
| 6,288,813 B1 | 9/2001 | Kirkpatrick et al. |
| 6,304,357 B1 * | 10/2001 | Ohhata et al. ............. 398/209 |
| 6,307,656 B2 | 10/2001 | Terahara |
| 6,317,231 B1 | 11/2001 | Al-Salameh et al. |
| 6,317,255 B1 | 11/2001 | Fatehi et al. |
| 6,323,950 B1 | 11/2001 | Kim et al. |
| 6,327,060 B1 | 12/2001 | Otani et al. |
| 6,356,384 B1 | 3/2002 | Islam |
| 6,359,729 B1 | 3/2002 | Amoruso |
| 6,388,801 B1 | 5/2002 | Sugaya et al. |
| 6,396,853 B1 | 5/2002 | Humphrey et al. |
| 6,513,136 B1 * | 1/2003 | Barker ............. 714/704 |
| 6,519,082 B2 | 2/2003 | Ghera et al. |
| 6,885,828 B1 * | 4/2005 | Cornelius ............. 398/209 |
| 6,915,076 B1 * | 7/2005 | Mittal et al. ............. 398/38 |
| 2001/0005271 A1 | 6/2001 | Leclerc et al. |
| 2001/0007605 A1 | 7/2001 | Inagaki et al. |
| 2001/0009468 A1 | 7/2001 | Fee |
| 2001/0014104 A1 | 8/2001 | Bottorff et al. |
| 2002/0012152 A1 | 1/2002 | Agazzi et al. |
| 2002/0015220 A1 | 2/2002 | Papernyl et al. |
| 2002/0034197 A1 | 3/2002 | Tornetta et al. |
| 2002/0044317 A1 | 4/2002 | Gentner et al. |
| 2002/0044324 A1 | 4/2002 | Hoshida et al. |
| 2002/0048069 A1 * | 4/2002 | Ibukuro ............. 359/154 |
| 2002/0048287 A1 | 4/2002 | Silvers |
| 2002/0051468 A1 | 5/2002 | Ofek et al. |
| 2002/0063948 A1 | 5/2002 | Islam et al. |
| 2002/0064181 A1 | 5/2002 | Ofek et al. |
| 2002/0075903 A1 | 6/2002 | Hind |
| 2002/0080809 A1 | 6/2002 | Nicholson et al. |

FOREIGN PATENT DOCUMENTS

| | | |
|---|---|---|
| JP | 02238736 | 9/1990 |

OTHER PUBLICATIONS

"Principles of Communication, 3rd Edition" by Ziemer et al., Houghton Mufflin, 1990, pp. 451-484.*

"Optical Networks: a Practical Perspective" by Rajiv Ramaswami, 1998, pp. 186-191.*

"Probability, Random Variables, and Stochastic Process", second edition, by Athanasios Papoulis, McGraw-Hill, 1984, pp. 110-113.*

J. Redd, "Optical extinction ration is dependent on noise and power", Planet Analog, Feb. 6, 2002.*

* cited by examiner

APPARATUS AND METHOD FOR OPTIMUM DECISION THRESHOLD SETTING

CROSS-REFERENCE TO RELATED APPLICATION

This application claims priority to U.S. Provisional Application No. 60/385,947, entitled "Apparatus and Method for Controlling the Decision Threshold in an Optical Network", by Eiselt, et al., filed Jun. 4, 2002, the content of which is incorporated by reference herein in its entirety.

FIELD OF THE INVENTION

The invention pertains to optical fiber transmission systems, and is particularly relevant to transmission of large volumes of data over long distances at high rates. An apparatus and method for improved bit-error-rate (BER) performance when transmitting optical data over long distances is disclosed. In particular, the improvement teaches the proper decision threshold setting of the optical signal at the receiver module.

BACKGROUND OF THE INVENTION

A goal of many modem long haul optical transport systems is to provide for the efficient transmission of large volumes of voice traffic and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalently wavelength, are co-propagate in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser may be directly modulated with a data train with an advantage of low cost, and a disadvantage of low reach and capacity performance. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two level binary modulation scheme is predominantly employed.

Often, the modulator is separate from the laser diode. This allows for a carrier signal with higher spectral purity and higher reach and capacity performance. One modulator may be used to directly encode the data onto the laser signal. For example, one modulator may be used to achieve a non-return-to-zero (NRZ) format. In a non-return-to-zero format, the instantaneous power of a high optical signal does not return to the low value between adjacent high data bits.

For best long haul transmission performance, the return-to-zero (RZ) performance is used. RZ signals, however, exhibit a larger bandwidth than NRZ signals. In practice, a two stage modulator may also be used to achieve this improved performance. For example, a first modulator may be used to shape a train of all high optical pulses with good contrast to the low value between pulses. A second modulator may then be used to encode the data onto this stream of pulses, effectively attenuating those bits that are to be encoded as zeros.

During transmission, attenuation in the optical fiber is compensated by in line optical amplifiers. The optical signal propagates through a span of fiber that may be 60-120 km long. At the end of each span, the signal is amplified in an optical amplifier. This process may be repeated over 60 times, for a total system reach of approximately 6000 km. The limit to the number of times this process may be repeated is determined by the optical noise from the optical amplifier.

The receiver is located at the opposite end of the optical fiber, from the transmitter. The receiver is typically comprised of a semiconductor photodetector, electrical amplifier, filter and decision circuitry. The role of the decision circuitry is to determine whether a bit is a zero (low) or a one (high) as accurately as possible in the presence of noise, or uncertainty in the level of the received bit. The resultant electrical noise in the received electrical signal stems from mixing of the optical noise with the signal power. Therefore the amount of noise in the (higher power) one rail is larger than the noise on the zero rail. Typically, the standard distribution of the probability density of ones is three times the standard deviation of the probability density of zeros. The decision process leads to the concept of a minimum or optimum bit-error-rate (BER). Erred ones are transmitted signal ones that are mistakenly detected as zeros. Erred zeros are transmitted signal zeros that are mistakenly detected as ones. The rate at which these errors occur is the BER. Typical BERs for optical transport equipment are in the $10^{-12}$ to $10^{-15}$ range. A BER of $10^{-15}$ implies that one erroneous reading is made in $10^{15}$ bits sent.

Current decision circuitry control in the art assumes that the number of erred ones are equal to the number of erred zeros for optimum BER. Since the standard deviations of the probability densities are different, this assumption is sub-optimal, and leads to an unnecessarily high BER. There is a need for a decision apparatus and method that sets the optimal threshold. Further there is a need for a decision apparatus and method that sets the optimal threshold in light of unequal standard deviations in the probability densities.

SUMMARY OF THE INVENTION

In the present invention, improvements to the receiver module of a fiber optic data transmission system are taught for improved signal-to-noise performance. An apparatus and method for improved bit-error-rate (BER) performance when transmitting optical data over long distances using are disclosed. In particular, the improvement teaches the proper decision threshold setting of the optical signal at the receiver module.

In one embodiment of the invention, an optical receiver is taught with an optimum decision threshold.

In another embodiment of the invention, an optical receiver is taught with a decision threshold that may be optimized.

In another embodiment of the invention, a method for optimizing the decision threshold of an optical receiver is taught.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments described herein are merely illustrative of specific ways to make and use the invention and do not delimit the scope of the invention.

Figure 1:
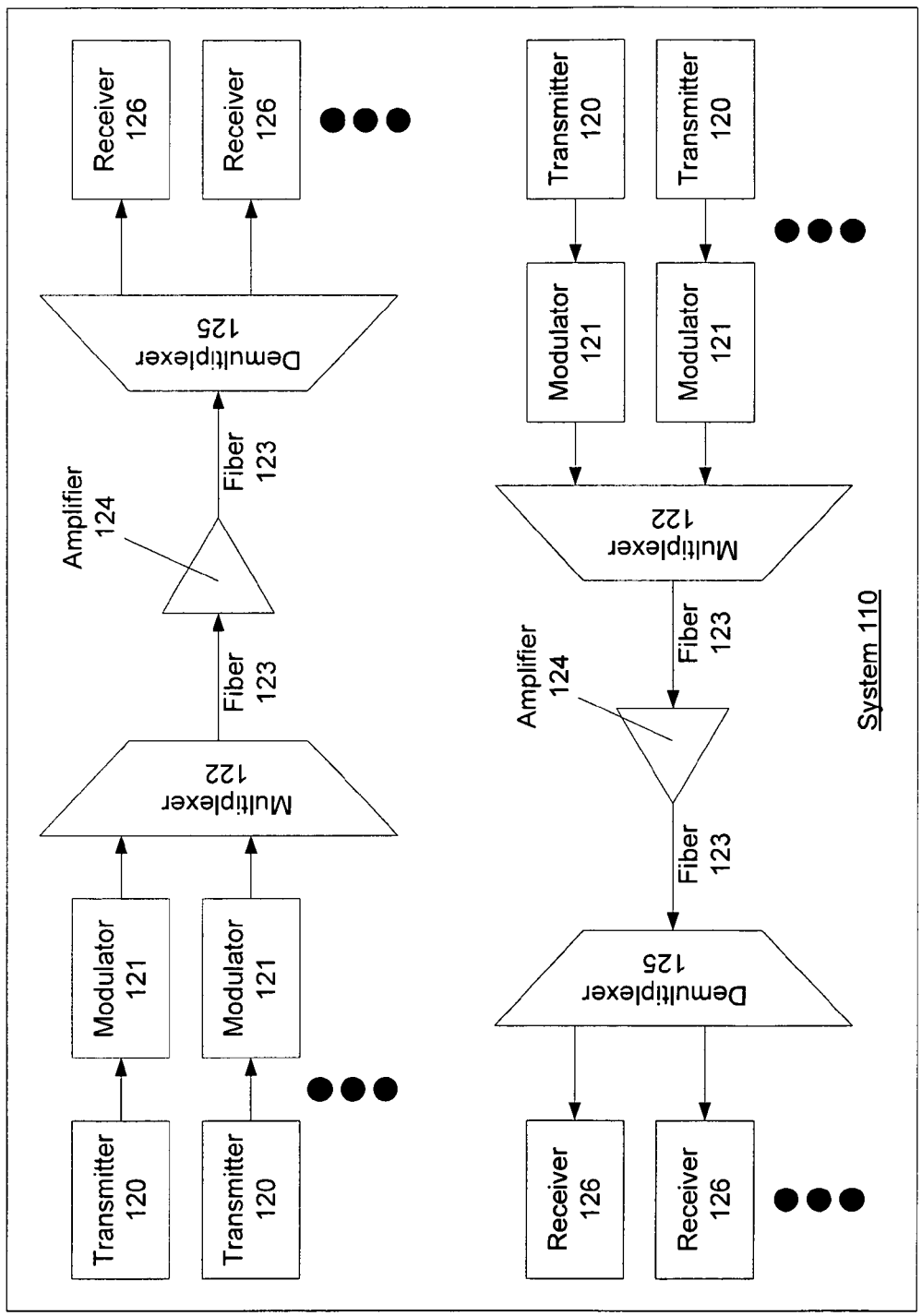
FIG. 1 is a schematic illustration of a prior art multiplexed optical transport system.

FIG. 1 is an illustrative block diagram of an optical transport system 110 for data and/or voice transmission used to support the present invention. Typical long haul optical transport dense wavelength division multiplexed (DWDM) systems transmit 40 to 80 10 Gbps (gigabit per second) channels across distances of 3000 to 6000 km in a single 30 nm spectral band. Shown in the FIGURE is a duplex system in which traffic is both transmitted and received between parties at opposite end of the link. The optical carrier is generated using laser transmitters 120. In current DWDM long haul transport systems laser transmitters 120 are DFB lasers stabilized to specified frequencies on the ITU frequency grid. In many systems, the carrier is externally modulated using a modulator 121. A single stage modulator is sufficient for an NRZ modulation format. With current devices, this single modulator may be a lithium niobate modulator which would be external to the laser. Alternatively, an external, electro-absorptive modulator may be integrated with the laser. Alternatively, in short reach systems, the laser may be modulated by direct modulation of the excitation injection current.

In a DWDM system, different channels operating at distinct carrier frequencies are multiplexed using a multiplexer 122. Such multiplexers may be implemented using array waveguide (AWG) technology or thin film technology, or a variety of other technologies. After multiplexing, the optical signals are coupled into the transport fiber 123 for transmission to the receiving end of the link. The total link distance may in current optical transport systems be two different cities separated by continental distances, from 1000 km to 6000 km, for example. To successfully bridge these distances with sufficient optical signal power relative to noise, the signal is periodically amplified using an in line optical amplifier 124. Typical span distances between optical amplifiers 124 is 50-100 km. Thus, for example, 30 100 km spans would be used to transmit optical signals between points 3000 km apart. Examples of inline optical amplifiers 124 include erbium doped fiber amplifiers (EDFAs) and semiconductor optical amplifiers (SOAs).

At the receiving end of the link, the optical channels are demultiplexed using a demultiplexer 125. Such demultiplexers may be implemented using array waveguide grating (AWG) technology or thin film technology, or a variety of other technologies. Each channel is then optically coupled to separate optical receivers 126.

It is a purpose of this invention to teach improved receiver modules for improved BER performance, and these improvements will be discussed in more detail below.

It should be noted that FIG. 1 depicts an optical transport system 110 supporting duplex operation wherein each endpoint can both send and receive voice and data traffic. This is important to achieve a typical conversation. In FIG. 1, duplex operation is shown to use two distinct fibers, the both together often referred to as a fiber pair. FIG. 1 is by restrictive in this or in many other instances. For example, optical transport systems are sometimes deployed with bidirectional traffic providing duplex service on a single fiber.

Other common variations include the presence of post-amplifiers and pre-amplifiers just before and after the multiplexer 122 and demultiplexer 125. Often, there is also included dispersion compensation with the in line amplifiers 124. These dispersion compensators adjust the phase information of the optical pulses in order to compensate for the chromatic dispersion in the optical fiber while appreciating the role of optical nonlinearities in the optical fiber. Another variation that may be employed is the optical dropping and adding of channels at cities located in between the two end cities. The invention disclosed herein, would find application in any of these variations, as well as others. For example, the improved receiver module taught herein would benefit short reach, or metro applications which may not include an inline optical amplifier 124.

Figure 2:
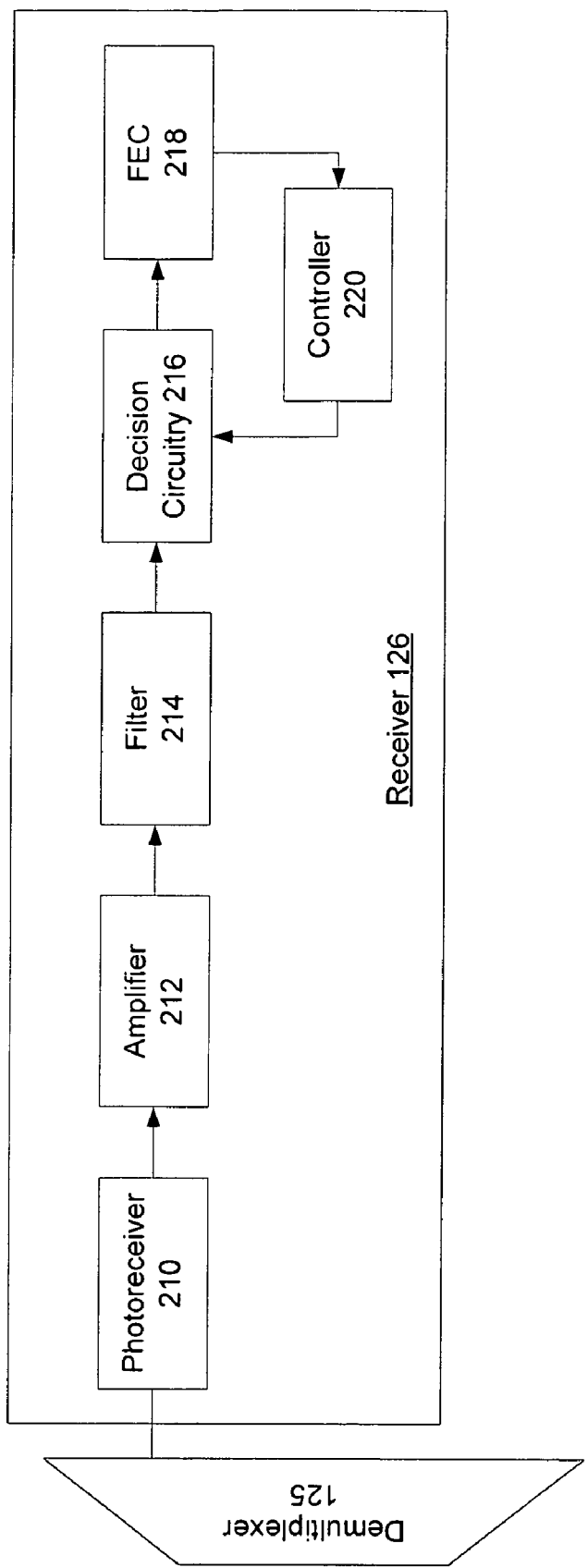
FIG. 2 is a schematic illustration of an optical receiver with an optimum decision threshold.

In FIG. 2 is shown a schematic representation of receiver 126 in accordance with the invention. Receiver 126 is shown in relation to demultiplexer 125. As shown in FIG. 2 receiver 126 comprises photoreceiver 210, electronic amplifier 212, electronic filter 214, decision circuitry 216 and forward error correction (FEC) circuitry 218. In a preferred embodiment, photoreceiver 210 is realized by a semiconductor photodetector, and converts received optical data into high speed electrical signals. In a preferred embodiment electronic amplifier 212 may be realized by a stripline RF FET amplifier. In a preferred embodiment electronic filter 214 is a low pass filter and may be realized by stripline RF capacitors and RF inductors. Functionally, electronic amplifier 212 amplifies said high speed electrical signals. Functionally, low pass electronic filter 214 rejects high frequency components that disproportionately contribute to noise. Decision circuitry 216 optimally converts the analog signal to either a 0 or a 1 binary digital signal. The decision circuitry may include clock recovery in order to extract a clock signal synchronous with and at the rate of the received signal, a quantizer wherein voltages above a threshold are assigned a mark, or a one, and voltages below the threshold are assigned a space or a zero, and a latch to retime the quantized data signal with the recovered clock to produce a data signal with minimum amplitude and phase distortion. In a preferred embodiment FEC circuitry 218 is an integrated circuit that performs a Reed-Solomon or other FEC algorithm that allows for additional optical transport link budget. Also shown in FIG. 2 is controller 220. In a preferred embodiment controller 220 comprises a microcontroller, memory and integrative logic.

The signal flow through receiver 126 may now be understood in reference to FIG. 2. In a preferred embodiment, WDM optical signals flow into demultiplexer 125 where different channels are sorted to different output ports. As shown in FIG. 2 one such output port leads to receiver 126. In photodetector 210, the optical signal is converted to an electrical signal. The electrical signal produced in photodetector 210 proceeds to electronic amplifier 212, and the electronic signal is amplified. The amplified output of electronic amplifier 212 is sent to electronic filter 214 for low pass filtering. The output of electronic filter 214 proceeds to decision circuitry 216, where bits above a threshold are decided to be ones, and bits below that threshold are decided to be zeros. The output of decision circuitry 216 proceeds to FEC circuitry 218. As part of the FEC process of correcting erred ones and erred zeros in accordance to the FEC algorithm, the FEC circuitry also records the number of erred ones and erred zeros over a time span. This information is sent to controller 220.

The optimum decision threshold apparatus in accordance with the invention may now be understood in reference to FIG. 2. Via feedback loop 230, Controller 220 adjusts the threshold level in decision circuitry 216 in order to reduce and minimize the number of erred ones $N_1$ and the number of erred zeros $N_0$ in accordance with the following algorithm. Let the ratio $R=N_1/N_0$, and $R_{opt}$ be a target ratio that provides the minimum number of erred ones $N_1$ and the minimum number of erred zeros $N_0$. If $R>R_{opt}$, then too many ones are erred and the decision threshold needs to be reduced. Conversely, if $R<R_{opt}$ then too many zeros are erred and the decision threshold needs to be increased.

The value for $R_{opt}$ for a particular transmission system depends mainly on the relative standard deviations of the one and zero rails, which is affected by many system parameters including but not limited to transmitter extinction ratio, fiber type and resulting amount of nonlinear impairments, and optical filter bandwidths. It also depends slightly on the system BER, which of course depends on all the same factors. Typically a value of $R_{opt}=3$, the ratio of the standard deviation of the ones probability density function to the standard deviation of the zeros probability density function. In an alternate embodiment, $R_{opt}$ is determined at channel turn-up by iteratively measuring the BER and adjusting $R_{opt}$ for the minimum BER.

In an alternate preferred embodiment, an inverting receiver is used as photodetector 210 and electronic amplifier 212. For an inverting receiver, the optical zeros have been transformed to a higher voltage than the optical ones. Therefore the standard deviation of the top rail, corresponding to transmitted zeros will be smaller than the lower rail, corresponding to transmitted ones. While the above procedure for optimum threshold tuning can still be followed, the value for $R_{opt}$ needs to be ⅓ for the typical signal. The resulting optimum threshold will then be at a lower voltage than the point where the erred ones and erred zeros are equal.

Figure 3:
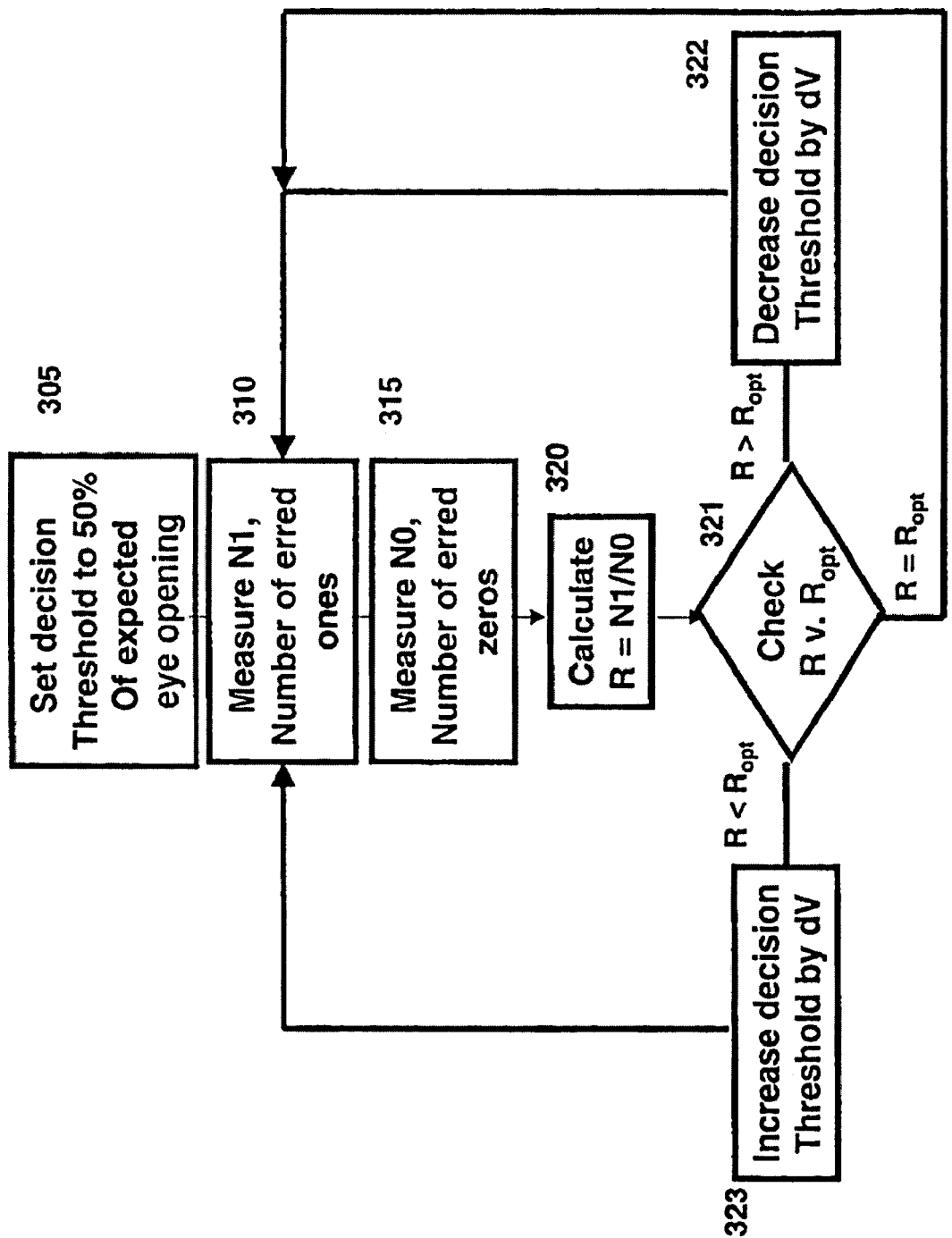
FIG. 3 is a method for optimizing the decision threshold of an optical receiver

In FIG. 3 is a flow chart illustrating a method for optimizing the decision threshold of an optical receiver in accordance with the invention. In step 305 the decision threshold is set to 50% of the expected "eye opening". The "eye opening" is well understood in the art as a measure of system performance. In step 310, the number of erred ones, $N_1$, are measured. In a preferred embodiment, $N_1$ is measured in the process of forward error correction. In step 315, the number of erred zeros, $N_0$, are measured. In a preferred embodiment, $N_0$ is measured in the process of forward error correction. In step 320, the ratio $R=N_1/N_0$, is calculated. In a preferred embodiment the ratio R is calculated in controller 220. In step 321, the value of R is checked against $R_{opt}$ by controller 220. If $R>R_{opt}$, then too many ones are erred and the decision threshold needs to be reduced. At step 322 the decision threshold is reduced by a set amount dV. In a preferred embodiment dV=5 mV. The cycle is then repeated at step 310. Conversely, if $R<R_{opt}$ then too many zeros are erred and the decision threshold needs to be increased. At step 323 the decision threshold is increased by dV. Control then returns to step 310 in the event that $R=R_{opt}$ then control returns directly to step 310 without changing the decision threshold. The value for $R_{opt}$ for a particular transmission system depends mainly on the relative standard deviations of the one and zero rails, which is affected by many system parameters including but not limited to transmitter extinction ratio, fiber type and resulting amount of nonlinear impairments, and optical filter bandwidths. It also depends slightly on the system BER, which of course depends on all the same factors. Typically a value of $R_{opt}=3$, the ratio of the standard deviation of the zeros probability density function to the standard deviation of the ones probability density function. In an alternate embodiment, $R_{opt}$ is determined at channel turn-up by iteratively measuring the BER and adjusting $R_{opt}$ for the minimum BER.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. An optical signal receiver comprising:
   a photodetector configured to receive and convert an optical signal into an electrical signal;
   an electronic amplifier configured to amplify the electrical signal;
   a decision circuit configured to convert the electrical signal into logical ones and logical zeros based on a decision threshold;
   a forward error correction circuit configured to count a number of erred logical ones and a number of erred logical zeros; and
   a feedback circuit configured to:
      compare a first ratio to a non-unitary parameter, wherein the first ratio is a ratio of the number of erred logical ones to the number of erred logical zeros, and wherein the non-unitary parameter consists essentially of the ratio of the standard deviation of the number of logical ones probability density function to the standard deviation of the number of logical zeros probability density function; and
      in response to a result of said comparison, decrease the decision threshold if the comparison indicates that the first ratio is greater than the non-unitary parameter and increase the decision threshold if the comparison indicates that the first ratio is less than the non-unitary parameter.

2. The optical signal receiver of claim 1, wherein the ratio of the standard deviation of the number of logical ones probability density function to the standard deviation of the number of logical zeros probability density function is approximately 3.

3. The optical signal receiver of claim 1, wherein the feedback circuit is configured to adjust the decision threshold to minimize a bit error rate associated with the optical signal.

4. The optical signal receiver of claim 1, wherein the feedback circuit comprises a micro controller.

5. The optical signal receiver of claim 1, wherein the non-unitary ratio parameter is determined by iteratively measuring a bit error rate associated with the optical signal.

6. The optical signal receiver of claim 1, wherein the non-unitary parameter is a function of at least one of the following: transmitter extinction ratio, fiber type, fiber nonlinear impairments, or optical filter bandwidth.

7. A method of optimizing a decision threshold in an optical receiver, the method comprising:
   measuring a number of erred ones in a signal;
   measuring a number of erred zeros in the signal;
   comparing a first ratio to a non-unitary parameter, wherein the first ratio is a ratio of the number of erred ones to the number of erred zeros, and wherein the non-unitary parameter consists essentially of the ratio of the standard deviation of the number of ones probability density function to the standard deviation of the number of zeros probability density function; and in response to a result of said comparison, decreasing the decision threshold if the comparison indicates that the first ratio is greater than the non-unitary parameter and increasing the decision threshold if the comparison indicates that the first ratio is less than the non-unitary parameter.

8. The method of claim 7, wherein the ratio of the standard deviation of the number of logical ones probability density function to the standard deviation of the number of logical zeros probability density function is about 3.

9. An optical signal receiver comprising:
a receiver unit configured to receive and convert an optical signal into an electronic signal;
a decision circuit connected to the receiver unit, wherein the decision circuit is configured to convert the electronic signal into logical ones and logical zeros based on a threshold;
a counting circuit connected to the decision circuit, wherein the counting circuit is configured to compute a number of erred ones and a number of erred zeros in the logical ones and the logical zeros; and
a controller connected to the counting circuit and the decision circuit, wherein the controller is configured to:
compare a first ratio to a non-unitary parameter, wherein the first ratio is a ratio of the number of erred logical ones to the number of erred logical zeros, and wherein the non-unitary parameter consists essentially of the ratio of the standard deviation of the number of logical ones probability density function to the standard deviation of the number of logical zeros probability density function;
in response to a result of said comparison, decrease the decision threshold if the comparison indicates that the first ratio is greater than the non-unitary parameter and increase the decision threshold if the comparison indicates that the first ratio is less than the non-unitary parameter.

10. The optical signal receiver of claim 9, wherein the ratio of the standard deviation of the number of logical ones probability density function to the standard deviation of the number of logical zeros probability density function is about 3.

11. The optical signal receiver of claim 9, further comprising a low pass filter connected to the receiver unit.

12. The optical signal receiver of claim 9, wherein the counting circuit comprises a forward error correction circuit.

13. The optical signal receiver of claim 9, wherein the receiver unit comprises an inverting receiver.

14. The optical signal receiver of claim 9, wherein the receiver unit comprises a photodetector.

15. The optical signal receiver of claim 9, wherein the receiver unit comprises a photodetector coupled with an electrical amplifier.

16. The method of claim 9, wherein the controller is configured to adjust the threshold by a predetermined amount if the ratio is less than or greater than the non-unitary parameter.

17. The method of claim 16, wherein the predetermined amount is approximately 5 mV.

18. A system for optimizing a decision threshold, the system comprising:
an optical fiber configured to transport an optical signal;
a demultiplexer coupled to the optical fiber, wherein the demultiplexer is configured to demultiplex the optical signal; and
an optical receiver coupled to the demultiplexer, wherein the optical receiver is configured to:

convert the demultiplexed optical signal into an electrical signal comprising logical ones and logical zeros based on a threshold value;
compare a first ratio to a non-unitary parameter, wherein the first ratio is a ratio of the number of erred logical ones to the number of erred logical zeros, and wherein the non-unitary parameter consists essentially of the ratio of the standard deviation of the number of logical ones probability density function to the standard deviation of the number of logical zeros probability density function;
in response to a result of said comparison, decrease the decision threshold if the comparison indicates that the first ratio is greater than the non-unitary parameter and increase the decision threshold if the comparison indicates that the first ratio is less than the non-unitary parameter.

19. The system of claim 18, wherein the optical receiver is further configured to determine the number of erred ones and the number of erred zeros associated with the electrical signal.

20. The system of claim 18, wherein the optical receiver is further configured to adjust the threshold value by a predetermined amount.

21. The system of claim 20, wherein the predetermined amount is approximately 5 mV.

22. The system of claim 18, wherein the non-unitary parameter is a function of at least one of the following: transmitter extinction ratio, fiber type, fiber nonlinear impairments, or optical filter bandwidth.

23. An optical receiver for converting a received optical signal into an electrical signal comprising logical ones and logical zeros based on a threshold, the optical receiver comprising:
means for counting a number of erred ones and a number of erred zeros in the logical ones and the logical zeros of the electrical signal; and
means for comparing a first ratio to a non-unitary parameter, wherein the first ratio is a ratio of the number of erred logical ones to the number of erred logical zeros, and wherein the non-unitary parameter consists essentially of the non-unitary ratio of the standard deviation of the number of logical ones probability density function to the standard deviation of the number of logical zeros probability density function;
means for, in response to a result of said comparison, decreasing the decision threshold if the comparison indicates that the first ratio is greater than the non-unitary parameter and increasing the decision threshold if the comparison indicates that the first ratio is less than the non-unitary parameter.

24. The optical receiver of claim 23, wherein the non-unitary ratio of the standard deviation of the number of logical ones probability density function to the standard deviation of the number of logical zeros probability density function is approximately ⅓.

25. The optical receiver of claim 23, wherein the non-unitary ratio of the standard deviation of the number of logical ones probability density function to the standard deviation of the number of logical zeros probability density function is approximately 3.

26. The optical receiver of claim 23, further comprising means for amplifying the electrical signal.

27. The optical receiver of claim 23, wherein the threshold is adjusted by a predetermined amount.

* * * * *

UNITED STATES PATENT AND TRADEMARK OFFICE
CERTIFICATE OF CORRECTION

PATENT NO.       : 7,603,042 B2                                Page 1 of 1
APPLICATION NO.  : 10/454813
DATED            : October 13, 2009
INVENTOR(S)      : Eiselt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 759 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,603,042 B2
APPLICATION NO. : 10/454813
DATED : October 13, 2009
INVENTOR(S) : Eiselt et al.

Page 1 of 1

It is certified that error appears in the above-identified patent and that said Letters Patent is hereby corrected as shown below:

Title page, item (56), under "Other Publications", in Column 2, Line 2, delete "Mufflin," and insert -- Mifflin, --.

Page 2, item (56), under "Other Publications", in Column 2, Line 2, delete "Mufflin," and insert -- Mifflin, --.

Column 1, line 26, delete "modem" and insert -- modern --.

Column 3, line 6, delete "receiver" and insert -- receiver. --.

Signed and Sealed this
Third Day of May, 2011

David J. Kappos
*Director of the United States Patent and Trademark Office*